(No Model.) 2 Sheets—Sheet 1.
M. C. HENLEY & J. P. FULGHAM.
OSCILLATING METER.
No. 443,711. Patented Dec. 30, 1890.
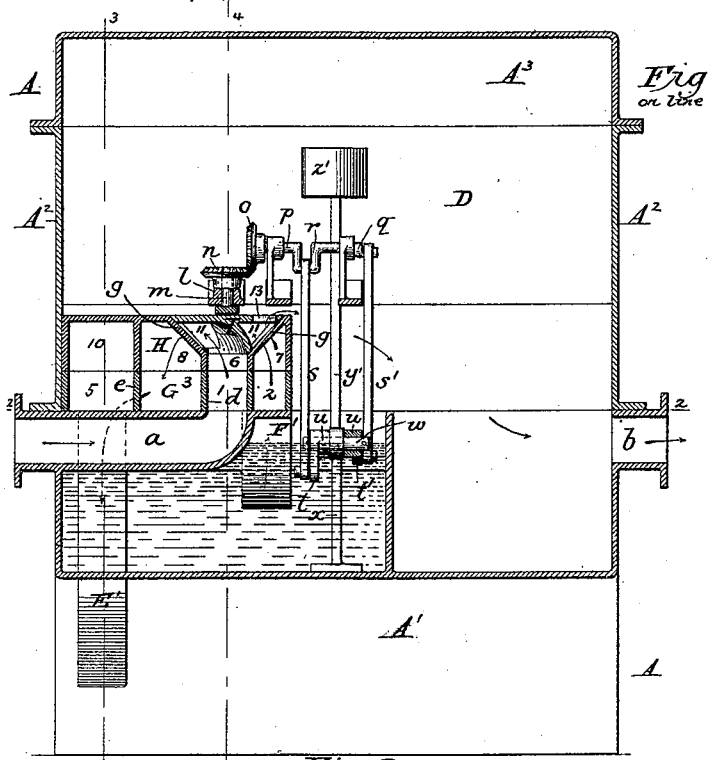
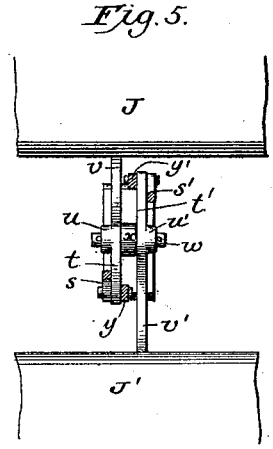
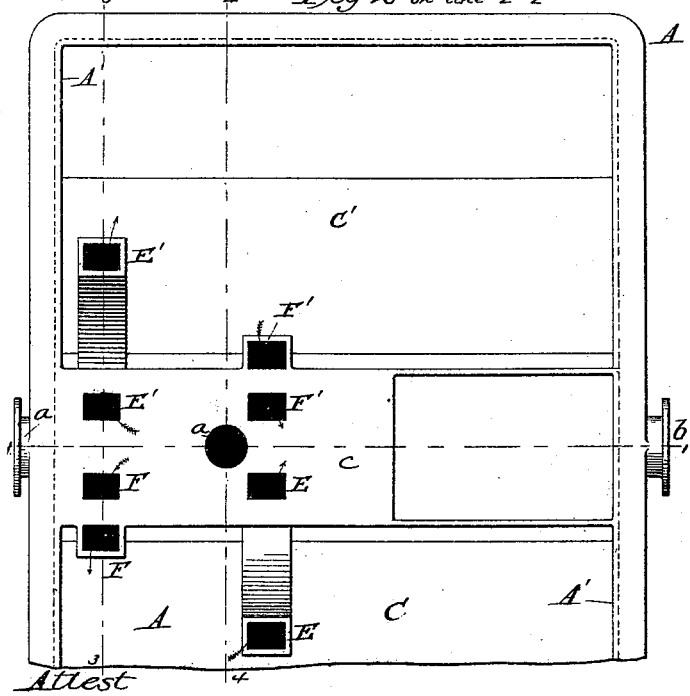
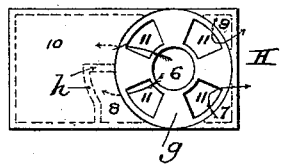
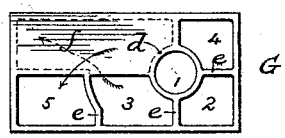
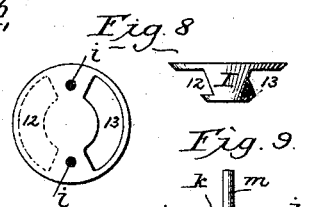
Inventors:
MICAJAH C. HENLEY,
JESSE P. FULGHAM,
by Dodge Sons,
Attorneys (No Model.) 2 Sheets—Sheet 2.
M. C. HENLEY & J. P. FULGHAM.
OSCILLATING METER.
No. 443,711. Patented Dec. 30, 1890.
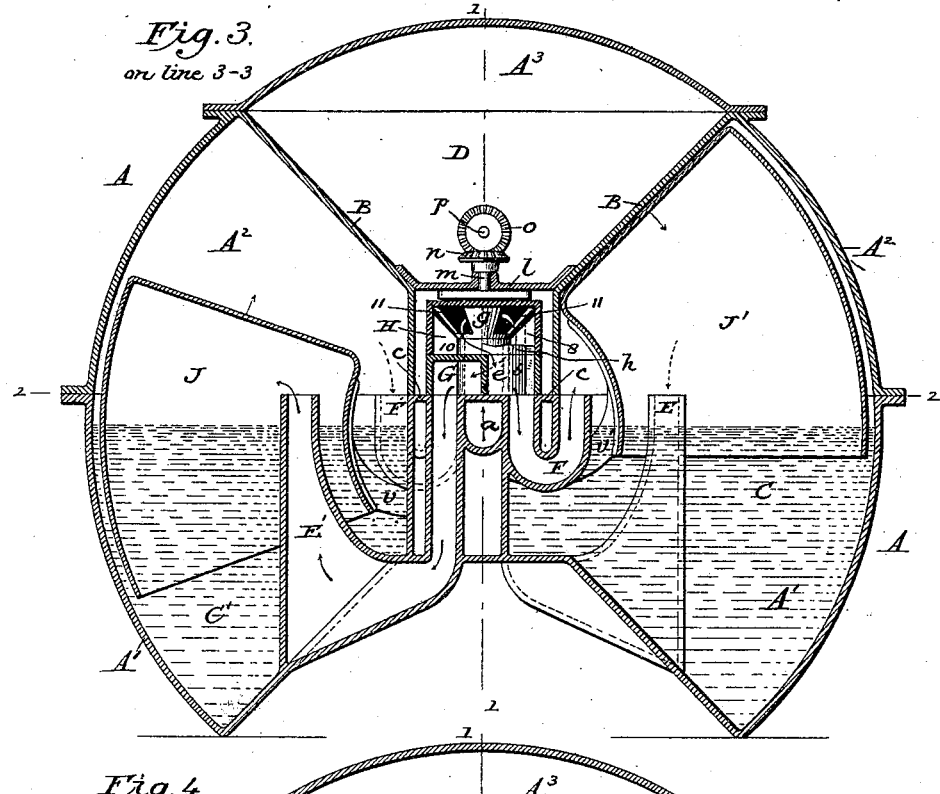
Fig. 3. on line 3-3
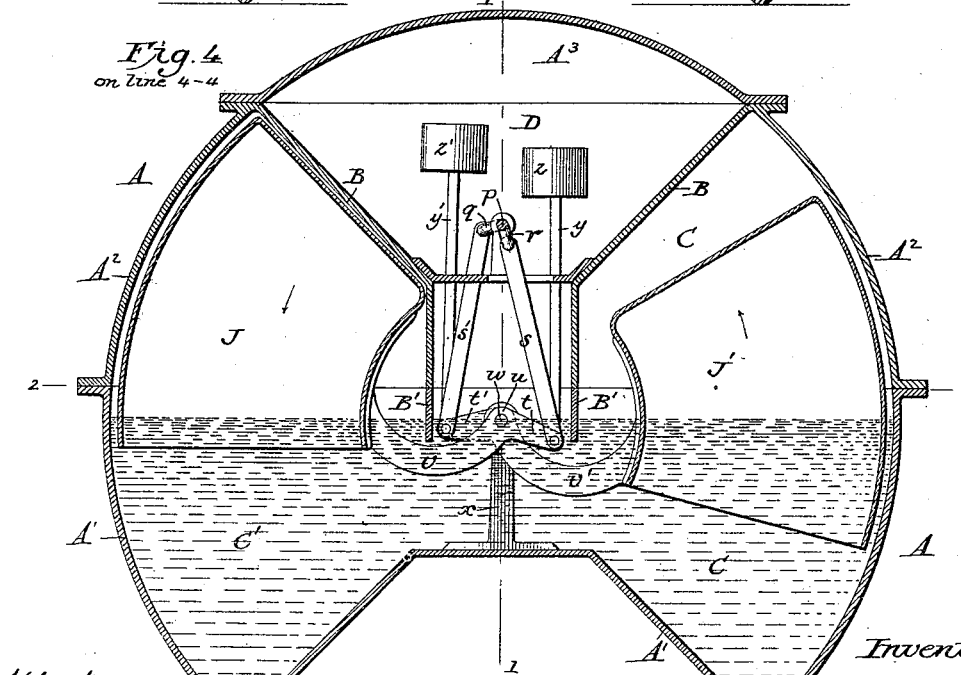
Fig. 4. on line 4-4
Attest:
Sidney P. Hollingsworth
Horace A. Dodge
Inventors.
M. C. HENLEY
J. P. FULGHAM,
by Dodge Sons,
Attorneys.
THE NORRIS PETERS CO., PHOTO-LITHO., WASHINGTON, D. C.

UNITED STATES PATENT OFFICE.

MICAJAH CHARLES HENLEY AND JESSE P. FULGHAM, OF RICHMOND, INDIANA; SAID FULGHAM ASSIGNOR TO EMMA R. FULGHAM, OF SAME PLACE.

OSCILLATING METER.

SPECIFICATION forming part of Letters Patent No. 443,711, dated December 30, 1890.

Application filed March 24, 1890. Serial No. 345,109. (No model.)

*To all whom it may concern:*

Be it known that we, MICAJAH CHARLES HENLEY and JESSE P. FULGHAM, citizens of the United States, residing at Richmond, in the county of Wayne and State of Indiana, have invented certain new and useful Improvements in Meters, of which the following is a specification.

Our invention relates to meters, and has reference more particularly to a meter in which the flow of the fluid is controlled by means of a rotary valve actuated by a pair of floats or buckets alternating in their movements. In our meter we employ two counterbalanced buckets or floats which are connected with a rock-shaft, and through intermediate connections impart motion to a rotary valve. This valve is so arranged relatively to the passages opening into the float-chambers as to keep all of the passages in action at all times, and as there are four of these passages, two for each float-chamber, the flow of the fluid into and out of each chamber will be practically continuous, although reversed in direction of travel periodically. The movement of the floats or buckets causes the shifting of the valve and a reversal of the direction of the flow of the fluid.

In the drawings, Figure 1 is a vertical sectional view of our improved meter on the line 1 1 of Fig. 3; Fig. 2, a horizontal sectional view of the same on the line 2 2; Fig. 3, a vertical sectional view on the line 3 3 of Fig. 1; Fig. 4 a vertical sectional view on the line 4 4 of Fig. 1; and Figs. 5, 6, 7, 8, and 9, views illustrating certain details of construction.

A indicates the case or shell, comprising a base A', an upper section A², and a cap A³, the upper section being provided with partitions B, which, in connection with similar partitions B' of the base-section, divide the interior of the case or shell into chambers C, C', and D, the former of which we designate the "float-chambers." The base-section A', advisably composed of a single casting, is provided with an inlet-pipe a, an outlet b, and with four passages E E' and F F', the upper ends of the passages or conduits terminating on a level with a plate c, cast integral with the section A'. Upon reference to Fig. 2 it will be noticed that the conduits or passages E F' open through the plate c close to the supply or inlet a, while the conduits E' F are at some distance from the latter, and it will also be observed that the mouths of the conduits F F' are set close to the plate, while those of the conduits E E' are set away therefrom.

Resting upon the plate c, over the openings therein, is a hollow box G, (shown separate in Fig. 7,) the said box being divided by means of partitions d and e into five chambers 1, 2, 3, 4, and 5, corresponding, respectively, to the openings a, E, E', F', and F. This box is further provided with a plate f, which is so arranged as to compel the fluid entering through inlet chamber or opening 1 to pass over the upper face of the plate to get into the chamber or opening 5, and to cause that which is to enter the opening or chamber 3 to pass under the plate, this arrangement being necessitated by the crossing of the currents.

H indicates a second hollow box or casing, having an open bottom and resting upon the open top box G, said box H having a valve-seat g and depending flanges h, as shown in Figs. 1, 3, and 6, which form passages or openings 6, 7, 8, 9, and 10, corresponding, respectively, to the openings 1, 2, 3, 4, and 5 of the box G. Openings 11 in the valve-seat connect the passages 7, 8, 9, and 10 with the central inlet-opening 6, as also shown in Figs. 1, 3, and 6.

I represents a conical valve fitted to the seat g, and provided with inlet and outlet ports 12 and 13, which are designed to work over the openings 11, and to thereby connect the conduits or passages F and F' alternately with the inlet or supply and the conduits E E' with the outlet, or vice versa. In other words, if the conduits F and E' be connected with the supply the conduits F' and E will be connected with the discharge, and while the conduits F' and E are connected with the supply the conduits E' and F will be connected with the outlet. Inasmuch as the conduits E F open into one float-chamber C and the conduits E' F' open into the other chamber C', it will be seen that the fluid will be entering and leaving both chambers at the same time. Valve I is provided with holes i in its upper face to receive pins j, projecting from an arm or disk $k$, which latter is journaled in an arm or bracket $l$ of the upper section $A^2$, as shown in Figs. 1 and 3, a small bevel-pinion $n$ being fitted to the stem or shaft $m$ of the disk or cross bar $k$ to mesh with a similar pinion $o$, carried at the end of a second shaft $p$. This shaft $p$, which is journaled in suitable bearings in the section $A^2$, is provided with two cranks $q$ and $r$, set at right angles to each other, as shown in Fig. 4. Connected with the cranks are pitmen $s$ $s'$, which are connected at their lower ends with the arms $t$ $t'$, projecting from the hubs $u$ $u'$, formed on the arms $v$ $v'$ of the hollow buckets or floats J J'. The hubs $u$ $u'$ of the bucket-arms $v$ $v'$ are mounted upon or carried by a rod $w$, supported in suitable brackets $x$ within the base-section A', the arms, with their attached buckets or floats, being free to oscillate or rock upon the rod $w$, and in thus oscillating or rocking to impart a continuous rotary motion to the valve I and to the shaft $p$.

Upon reference to Fig. 5 it will be seen that the arm $t$ of the bucket J extends to one side of rod $w$, while the arm $t'$ of the bucket J' extends to the opposite side of said rod. Secured to the ends of the arms $t$ $t'$ are upright rods $y$ $y'$, carrying at their upper ends weights $z$ $z'$ for the purpose of counterbalancing the buckets or floats, the rods being guided in their movements by means of a plate carried by the upper section $A^2$ of the case or shell. The shaft $p$, before referred to, will of course be connected with a suitable registering mechanism; but as the latter forms no part of the present invention it is not illustrated. The casing is made air-tight and the lower section is partially filled with water or equivalent sealing-fluid, as indicated in Fig. 3, thereby effecting a seal and rendering lubrication of the principal working parts unnecessary. The floats or buckets are open on the lower side, and, while they at all times cover the mouths of the conduits E E', they leave the mouths of the conduits F F' open to the space or chamber in which they work, so that the fluid may either enter through said conduits F F' and depress the floats or permit the fluid to escape from above the latter as they are raised by the fluid entering beneath through the conduits E E'. The cranks $q$ $r$ of shaft $p$ are so set or arranged that when one of the buckets is at its extreme position either up or down, the opposite bucket will be about half-way between such extreme positions.

The operation may be briefly stated as follows: As shown in Fig. 3, the bucket J' is raised up to its highest position and the bucket J has risen about midway of the chamber C. The valve I is now in such position as to let the gas or other fluid through the conduits F and E' and above the float J' and beneath the float J, thereby causing a depression of the former and an elevation of the latter. At the same time the valve connects the conduits E and F' with the outlet-chamber, so that the gas that is above the float J may escape through conduit F', and that which is beneath the float J' to escape through the conduit E. From this it follows that there are two measuring-chambers C C' filling and two emptying all the time, except for the instant that the currents are reversed by the change in position of the valve, caused by the rise and fall of the floats or buckets. The division of the case or shell in the manner shown and the introduction of the sealing-liquid gives us practically five separate chambers or compartments, one above and one below each bucket and the central outlet-chamber, and this, taken in connection with the filling and emptying action just above referred to, gives our meter double the capacity of the ordinary meter. By removing the cap $A^3$ access may be had to gearing $n$ $o$.

Having thus described our invention, what we claim is—

1. In a meter, the shell or casing A, comprising a base A', having passages $a$ $b$, conduits E E' F F', and upright partitions B' B', an intermediate section $A^2$, having partitions B B meeting the partitions B' B' and adapted to divide the shell into three chambers C, C', and D and to form a cover for the former, and a cap $A^3$, adapted to form a cover for the chamber D, all substantially as shown and described.

2. In a meter, the combination, with a shell or casing having two float-chambers and inlet and outlet passages, of a pair of independent pivoted floats, one for each chamber, a pair of conduits for each chamber, communicating with the inlet and outlet passages, a single valve for controlling the passage of fluid through the four conduits, and intermediate connections between the valve and floats, all substantially as shown and described.

3. In a meter, the combination, with a shell or casing having two float-chambers and inlet and outlet passages, of a pair of independent pivoted floats, one for each chamber, a pair of conduits for each chamber, communicating with the passages, one conduit of each pair extending upward beneath its respective float, a single valve adapted to control and reverse the current of the fluid passing through the conduits, and intermediate connections between the valve and float, all substantially as shown and described.

4. In a meter, the combination, with a shell or casing having two float-chambers and inlet and outlet passages, of a float for each chamber, a pair of conduits E F, opening into one chamber, a pair of conduits E' F', opening into the other chamber, and both pairs of conduits communicating with the passages, and a single rotary valve I, controlling the passage of fluid through the conduits and passages and actuated by the floats, all substantially as shown and described, whereby a practically-continuous current is permitted to pass through the meter.

5. In a meter, the combination, with a shell or casing having two float-chambers and suitable inlet and outlet passages, of a cup-shaped float for each chamber, adapted to rise from and to pass downward into the sealing-liquid, conduits E E', opening, respectively, into the spaces beneath the floats, conduits F F', opening, respectively, into the float-chambers, a single rotary valve adapted to connect the conduits E' F with the inlet and the conduits E F' with the outlet, and vice versa, and the intermediate connections between the valve and floats, all substantially as shown, whereby the rising and falling of the floats will cause the actuating of the valve and a reversal of the currents.

6. In a meter, the combination, with the shell having the chambers C C', of suitable supply and discharge openings $a$ $b$ and conduits E E' F F', the floats J J', provided with arms $v$ $v'$ and $t$ $t'$, a shaft $p$, having cranks $q$ $r$ and bevel-gear $o$, pitmen $s$ $s'$, connecting the arms $t$ $t'$ with the cranks, a valve, and a bevel-pinion secured to the stem of the valve.

7. In a meter, the combination of a shell or casing having two float-chambers and inlet and outlet passages, conduits for conveying and discharging fluid to and from the chambers, the independent oscillating floats, one in each chamber, a single rotary valve governing the passage of fluid through the conduits, a shaft, bevel-gearing connecting the shaft with the valve, and intermediate connections between the shaft and floats, whereby the oscillations of the latter impart a rotary motion to the shaft and valve and cause a reversal of the currents passing through the conduits.

8. In a meter, the combination, with a base-section A', having conduits E E' F F' and inlet and outlet openings $a$ $b$, of hollow box G, provided with passages 1, 2, 3, 4, and 5, open-bottom box H, provided with passages 6, 7, 8, 9, and 10 and with a valve-seat having openings 11, and a valve I, provided with ports 12 and 13.

9. In a meter, the combination, with the box G, of the conduits E E' F F', leading from the box to the measuring-chambers, a box H, provided with a valve-seat and serving as a cover for box G, and a valve provided with inlet and outlet ports 12 and 13 to connect the conduits E F' and F E' alternately with the supply-pipe.

10. In a meter, the combination, with an open frame or box G, having inlet 1, separated compartments 2, 3, 4, and 5, and a plate, of conduits E E' F F', extending from the measuring-chambers to the box G, a hollow box H, provided with a valve-seat and with compartments 7, 8, 9, and 10, and a valve I, all substantially as shown.

11. In a meter, the combination of the rotary valve I, a cross-bar $l$, secured to the meter-casing, a shaft $m$, journaled in the cross-bar and provided at its upper end with a gear-wheel $n$ and at its lower end with an arm $k$ to engage and turn the valve, a shaft $p$, having a pinion $o$ to mesh with gear $n$, and means for rotating the shaft $p$, all substantially as shown and described.

In witness whereof we hereunto set our hands in the presence of two witnesses.

MICAJAH CHARLES HENLEY.
JESSE P. FULGHAM.

Witnesses:
WEB. PARRY,
WILLIAM E. BELL.